United States Patent
Zhang et al.

(10) Patent No.: US 11,574,538 B2
(45) Date of Patent: Feb. 7, 2023

(54) METHOD AND APPARATUS FOR PERCEPTION-SHARING BETWEEN VEHICLES

(71) Applicant: GM GLOBAL TECHNOLOGY OPERATIONS LLC, Detroit, MI (US)

(72) Inventors: Sycamore Zhang, Shanghai (CN); Jimmy Qi, Shanghai (CN)

(73) Assignee: GM Global Technology Operations LLC, Detroit, MI (US)

( * ) Notice: Subject to any disclaimer, the term of this patent is extended or adjusted under 35 U.S.C. 154(b) by 154 days.

(21) Appl. No.: 16/542,780

(22) Filed: Aug. 16, 2019

(65) Prior Publication Data

US 2021/0049902 A1 Feb. 18, 2021

(51) Int. Cl.

| | |
|---|---|
| *G08G 1/01* | (2006.01) |
| *H04W 4/44* | (2018.01) |
| *H04W 4/02* | (2018.01) |
| *G08G 1/00* | (2006.01) |
| *G05D 1/02* | (2020.01) |
| *H04L 67/10* | (2022.01) |

(52) U.S. Cl.
CPC ......... *G08G 1/0125* (2013.01); *G05D 1/0291* (2013.01); *G08G 1/0116* (2013.01); *G08G 1/20* (2013.01); *H04W 4/027* (2013.01); *H04W 4/44* (2018.02); *H04L 67/10* (2013.01)

(58) Field of Classification Search
CPC ...... G08G 1/0125; G08G 1/0116; G08G 1/20; H04W 4/44; H04W 4/027; G05D 1/0291; H04L 67/10
See application file for complete search history.

(56) References Cited

U.S. PATENT DOCUMENTS

| | | | | |
|---|---|---|---|---|
| 10,679,315 | B2 * | 6/2020 | Risinger | ............... G06V 20/54 |
| 2018/0276485 | A1 | 9/2018 | Heck et al. | |
| 2020/0017117 | A1 * | 1/2020 | Milton | .................. B60W 50/02 |
| 2020/0137580 | A1 * | 4/2020 | Yang | .................... H04W 12/06 |

(Continued)

FOREIGN PATENT DOCUMENTS

| | | |
|---|---|---|
| CN | 103373354 A | 10/2013 |
| CN | 106053879 A | 10/2016 |

(Continued)

*Primary Examiner* — Ig T An
*Assistant Examiner* — Stephanie T Su
(74) *Attorney, Agent, or Firm* — Quinn IP Law

(57) ABSTRACT

A method for perception-sharing between similarly-situated vehicles that are traveling on a portion of a roadway that is equipped with an intelligent vehicle highway system is described, and includes executing, in a multi-access edge computing cluster in communication with a roadside unit disposed to monitor a roadway, an application-layer routine. The application-layer routine includes collecting real-time data associated with a plurality of objects from each of the similarly-situated vehicles, predicting motion of each of the plurality of objects based upon the real-time data, object-matching the motion of each of the plurality of objects, and executing fusion of the plurality of objects based upon the object-matching of the motion of each of the plurality of objects. Locations of the similarly-situated vehicles traveling on the roadway are identified based upon the fusion of the plurality of objects. The locations are communicated to one of the similarly-situated vehicles.

20 Claims, 3 Drawing Sheets

(56) References Cited

U.S. PATENT DOCUMENTS

2020/0166372 A1    5/2020  Watanabe
2020/0204614 A1    6/2020  Schmitz et al.
2021/0024095 A1*   1/2021  Tao ..................... G08G 1/164

FOREIGN PATENT DOCUMENTS

| CN | 108447291 A | 8/2018 |
| CN | 108922188 A | 11/2018 |
| CN | 109131346 A | 10/2019 |

* cited by examiner

METHOD AND APPARATUS FOR PERCEPTION-SHARING BETWEEN VEHICLES

INTRODUCTION

There is a need to robustly monitor high density real-time traffic situations to help smooth traffic flow, improve response of emergency vehicles, and provide additional services. There is a further need for vehicles equipped with advanced driver assistance systems to robustly monitor high density real-time traffic situations.

SUMMARY

A systematic solution is provided for perception-sharing through vehicle-to-everything (V2X) communication, which supports a wide range of applications, thereby facilitating the implementation of related products with the use of standardized application program interfaces (APIs). Elements of this solution include a software architecture for minimizing processing latency, together with routines that combine use of distance and visual descriptors to identify overlap between perception results captured from several vehicles. The concepts enable blind area monitoring, detection, and mitigation for individual vehicles and other applications based on sensory information that is obtained over V2X communication, while mitigating processing latency and ensuring robustness in a high-density real-time traffic situation.

An aspect of the disclosure includes a computer-implemented method for perception-sharing between a plurality of similarly-situated vehicles that are traveling on a portion of a roadway that is equipped with an intelligent vehicle highway system. This includes executing, in a multi-access edge computing cluster in communication with a roadside unit disposed to monitor a portion of a roadway, an application-layer routine. The application-layer routine includes collecting real-time data associated with a plurality of objects from each of the plurality of similarly-situated vehicles traveling on the portion of the roadway, predicting motion of each of the plurality of objects based upon the real-time data from the plurality of similarly-situated vehicles, object-matching the motion of each of the plurality of objects, wherein the object-matching is subjected to a time constraint, and executing fusion of the plurality of objects based upon the object-matching of the motion of each of the plurality of objects. Locations of the similarly-situated vehicles traveling on the portion of the roadway are identified based upon the fusion of the plurality of objects. The locations of the similarly-situated vehicles traveling on the portion of the roadway are communicated to one of the similarly-situated vehicles.

Another aspect of the disclosure includes collecting real-time data related to distance, a visual descriptor, a lane-level lateral position, and a speed estimation of each of the plurality of objects, a corresponding time stamp, and a geo-spatial positioning of the respective one of the plurality of similarly-situated vehicles.

Another aspect of the disclosure includes linearly extrapolating the positioning data of each of the plurality of objects to predict motion of each of the plurality of objects based upon the real-time data from the plurality of similarly-situated vehicles.

Another aspect of the disclosure includes executing blind area monitoring by at least one of the plurality of similarly-situated vehicles based upon the fusion of the plurality of objects.

Another aspect of the disclosure includes the similarly-situated vehicles being a plurality of vehicles that are travelling in the same direction on the portion of the roadway.

Another aspect of the disclosure includes determining a location, speed and trajectory of each of the plurality of similarly-situated vehicles.

Another aspect of the disclosure includes an application-layer software routine in communication with a roadside unit that is arranged to monitor a portion of a roadway. The software routine includes an instruction set that is executable to collect real-time data associated with a plurality of objects from each of a plurality of similarly-situated vehicles traveling on the portion of the roadway, predict motion of each of the plurality of objects based upon the real-time data from the plurality of similarly-situated vehicles, object-match the motion of each of the plurality of objects, wherein the object-matching is subjected to a time constraint, and fuse the plurality of objects based upon the object-matching of the motion of each of the plurality of objects. Locations of the plurality of similarly-situated vehicles traveling on the portion of the roadway are identified based upon the fused plurality of objects and communicated, via the roadside unit, to one of the similarly-situated vehicles.

Another aspect of the disclosure includes the application-layer software routine being arranged to be executed by a multi-edge computing cluster.

Another aspect of the disclosure includes communicating, via the roadside unit, the locations of the similarly-situated vehicles traveling on the portion of the roadway to one of the similarly-situated vehicles, wherein the one of the similarly-situated vehicles includes an advanced driver-assistance system (ADAS).

Another aspect of the disclosure includes controlling the one of the similarly-situated vehicles that includes an advanced driver-assistance system based upon the locations of the similarly-situated vehicles traveling on the portion of the roadway.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

The appended drawings are not necessarily to scale, and may present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. Furthermore, the drawings are in simplified form and are not to precise scale. For purposes of convenience and clarity only, directional terms such as left, right, front, rear, etc., may be used with respect to the drawings. These and similar directional terms are not to be construed to limit the scope of the disclosure. Furthermore, the disclosure, as illustrated and described herein, may be practiced in the absence of an element that is not specifically disclosed herein.

Figure 1:
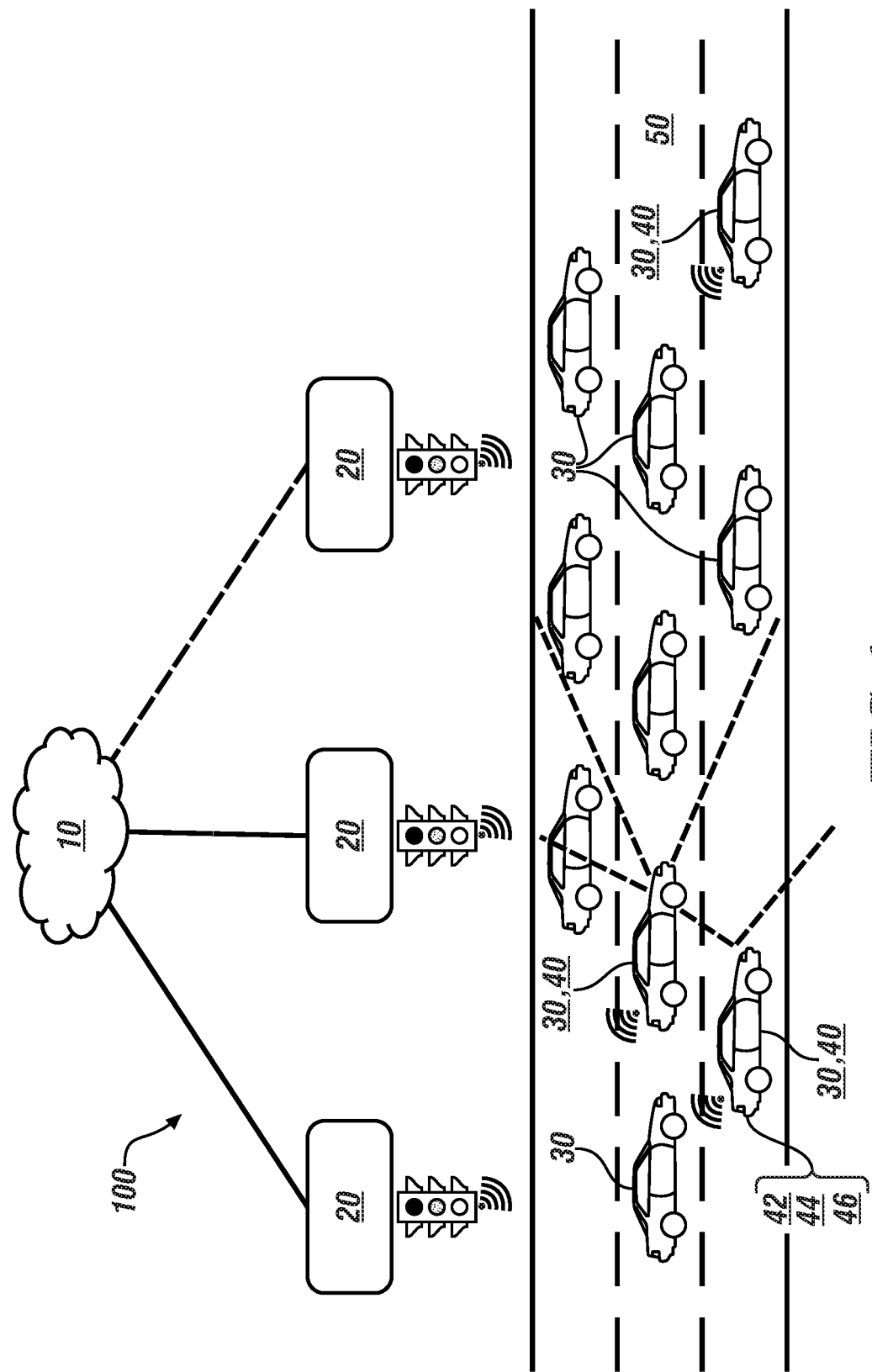
FIG. 1 schematically illustrates a plurality of vehicles travelling on a multi-lane highway that is equipped with an embodiment of an intelligent vehicle/highway system (IVHS), in accordance with the disclosure.

Referring to the drawings, wherein like reference numerals correspond to like or similar components throughout the several Figures, FIG. 1, consistent with embodiments disclosed herein, schematically illustrates a plurality of vehicles 30 that are travelling on a portion of a multi-lane highway 50 that is equipped with an embodiment of an intelligent vehicle/highway system (IVHS) 100 that includes a Multi-Access Edge Computing (MEC) cluster 10 and a plurality of road-side units (RSUs) 20. The MEC cluster 10 includes a Multi-Access Edge Computing (MEC) perception-sharing routine (routine) 200, as described with reference to FIGS. 2 and 3.

Each of the vehicles 30 may include, but not be limited to a mobile platform in the form of a commercial vehicle, industrial vehicle, agricultural vehicle, passenger vehicle, aircraft, watercraft, train, all-terrain vehicle, personal movement apparatus, robot and the like to accomplish the purposes of this disclosure. A subset of the vehicles 30 may be connected vehicles 40. Connected vehicles 40 are equipped with a spatial monitoring system 44 and a telematics communication system 42 that is capable of wireless extra-vehicle communications. One or more of the connected vehicles 40 may include an advanced driver-assistance system (ADAS) 46.

The telematics communication system 42 is capable of extra-vehicle communications, including communicating with a communication network system that may include wireless and wired communication capabilities. The telematics communication system 42 includes a telematics controller that is capable of extra-vehicle communications that includes vehicle-to-everything (V2X) communication. The V2X communication includes short-range vehicle-to-vehicle (V2V) communication, and communication to one or more of the RSUs 20, thus facilitating localized communication between a plurality of similarly-situated vehicles that are moving parts of the IVHS 100. Alternatively or in addition, the telematics communication system 42 is capable of short-range wireless communication to a handheld device, e.g., a cell phone, a satellite phone or another telephonic device. In one embodiment the handheld device is loaded with a software application that includes a wireless protocol to communicate with the telematics controller, and the handheld device executes the extra-vehicle communication, including communicating with an off-board controller via a communication network. Alternatively or in addition, the telematics controller executes the extra-vehicle communication directly by communicating with the off-board controller via the communication network.

The spatial monitoring system 44 includes a plurality of spatial sensors that are in communication with a spatial monitoring controller, wherein each of the spatial sensors is disposed on-vehicle to monitor a field-of-view surrounding the connected vehicle 40, including other vehicles 30 that are proximal to the connected vehicle 40. The spatial monitoring controller generates digital representations of each of the fields of view including the proximal vehicles 30 based upon data inputs from the spatial sensors. The spatial monitoring controller can evaluate inputs from the spatial sensors to determine a linear range, relative speed, and trajectory of the connected vehicle 40 in view of each of the proximal vehicles 30. The spatial sensors can be located at various locations on the connected vehicle 40, including the front corners, rear corners, rear sides and mid-sides. The spatial sensors can include a front radar sensor and a camera in one embodiment, although the disclosure is not so limited. Placement of the aforementioned spatial sensors permits the spatial monitoring controller to monitor traffic flow including proximate vehicles and other objects in the vicinity of the connected vehicle 40. The spatial sensors of the spatial monitoring system 44 can further include object-locating sensing devices including range sensors, such as FM-CW (Frequency Modulated Continuous Wave) radars, pulse and FSK (Frequency Shift Keying) radars, and Lidar (Light Detection and Ranging) devices, and ultrasonic devices which rely upon effects such as Doppler-effect measurements to locate forward objects. The possible object-locating devices include charged-coupled devices (CCD) or complementary metal oxide semi-conductor (CMOS) video image sensors, and other camera/video image processors which utilize digital photographic methods to 'view' forward objects including one or more vehicle(s).

Each of the connected vehicles 40 includes a propulsion system, a wheel braking system, and a steering system. In one embodiment, the operation of the propulsion system, the wheel braking system, and the steering system may be controlled by direct interaction with a vehicle operator alone, or in combination with the ADAS 46, employing inputs from the spatial monitoring system 44.

The ADAS 46 is arranged to provide operator assistance features by controlling one or more of the propulsion system, the wheel braking system, and the steering system with little or no direct interaction of the vehicle operator. The ADAS 46 includes a controller and one or a plurality of subsystems that provide operator assistance features, including one or more of an adaptive cruise control (ACC) system, a lane-keeping control (LKY) system, a lane change control (LCC) system, an autonomous braking/collision avoidance system, and/or other systems that are configured to command and control autonomous vehicle operation separate from or in conjunction with operator requests. The ADAS 46 may interact with and access information from an on-board map database for route planning and to control operation of the connected vehicle 40 via the lane-keeping system, the lane-centering system, and/or other systems that are configured to command and control autonomous vehicle operation.

Autonomous operating commands may be generated to control the ACC system, the LKY system, the LCC system, the autonomous braking/collision avoidance system, and/or the other systems. Vehicle operation includes operation in a propulsion mode in response to desired commands, which can include operator requests and/or autonomous vehicle requests. Vehicle operation, including autonomous vehicle operation includes acceleration, braking, steering, steady-state running, coasting, and idling. Operator requests can be generated based upon operator inputs to an accelerator pedal, a brake pedal, a steering wheel, a transmission range selector, the ACC system, etc.

As can be appreciated, each of the connected vehicles 40 traveling on the portion of the multi-lane highway 50 may be capable of detecting one or more of the other vehicles 30 that are proximal thereto employing inputs from the spatial monitoring system 44. However, some of the vehicles 30 proximal thereto may be undetectable due to masking caused by other, intervening vehicles 30. Masking by intervening vehicles 30 causes the blind areas that cannot be perceived by one or more of the connected vehicles.

The IVHS 100 includes the MEC cluster 10, which may be remotely-located and is in communication with the plurality of road-side units (RSUs) 20, and can be configured to monitor locations, speeds and trajectories of a plurality of vehicles 30, including a plurality of similarly-situated ones of the vehicles 30 that are travelling on the portion of the multi-lane highway 50. Similarly-situated vehicles are those vehicles 30 that are travelling in the same direction on the same portion of the multi-lane highway 50. In one embodiment, the same portion of the multi-lane highway 50 includes a portion of the multi-lane highway 50 that is within communication range of one of the RSUs 20.

The MEC cluster 10 includes a cloud-based IT (information technology) service environment located at the edge of a network. The purpose of edge computing and the MEC cluster 10 is to bring real-time, high-bandwidth, low-latency access to latency-dependent applications that are distributed at the edge of the network. Since edge computing is closer to the end user and apps, it allows for localized and cloud-based applications. Edge computing reduces network congestion and improves application performance by executing related task processing closer to the end user, i.e., the connected vehicle 40, improving the delivery of content and applications to those users. The MEC cluster 10 moves the computing of traffic and services from a centralized cloud to the edge of the network and closer to the connected vehicle 40, and the network edge analyzes, processes, and stores the data. This serves to reduce communication and processing latency. Characteristics of the MEC cluster 10 and road-side units (RSUs) 20 include proximity, ultra-low latency, high bandwidth, and virtualization. When deployed on-vehicle, the connected vehicle 40 is able to constantly sense driving patterns, road conditions and other vehicle movements to provide guidance to the vehicle operator and the ADAS 46. Most of the predictive and prescriptive insights need to be provided in a timely manner, which means that data from the spatial monitoring system 44 needs to be collected, processed and analyzed by the MEC cluster 10 to provide low latency insights to the vehicle operator and the ADAS 46.

The MEC cluster 10 includes an application-layer software architecture and algorithm design that enables efficient processing for cooperative perception of the driving environment on the portion of the multi-lane highway 50, with the original perception results provided by individual ones of the connected vehicles 40, and the fused perception results provided by the RSUs 20 following the fusion tasks performed by MEC cluster 10. The core tasks include identifying overlap between perception results from a plurality of similarly-situated vehicles, mitigating processing latency, and providing data usable by a wide range of applications to a plurality of functionality modules. Applications may be related to traffic monitoring, detection of congestions, detection of emergency vehicles and roadside assistance vehicles, access and parking system operation, enforcement systems, multi-lane and single lane free flow systems, etc.

The MEC cluster 10 provides a systematic solution for perception-sharing among connected vehicles and infrastructure through multi-access edge computing (MEC), including an architecture and algorithm design of software modules for fusion tasks to be performed efficiently. The MEC cluster 10 can be used to support a wide range of applications carried by individual vehicles or infrastructure sites, with negligible errors in real-time. This enables blind area monitoring, detection, and mitigation for individual vehicles and other applications based on sensory information that is obtained over V2X, with effective approach for latency mitigation and ensuring robustness against high populated real-time traffic situations.

The road-side units (RSUs) 20 are transceivers configured for Dedicated Short-Range Communications (DSRC) that may be mounted along a road or a pedestrian passageway. RSUs 20 communicate using short-range, low-power data transmissions of limited duration. The main function of each of the RSUs 20 is to facilitate the communication between vehicles, transportation infrastructure, and other devices by transferring data over DSRC in accordance with industry standards, e.g., SAE Standard J2735 (SAE J2735—Dedicated Short Range Communications (DSRC) Message Set Dictionary). The RSUs 20 are integrated into and communicate with the MEC cluster 10. Each of the RSUs 20 may be in communication with a traffic monitoring fixture (not shown), such a roadside camera or another device. Each RSU 20 broadcasts data to or exchanges data with connected vehicles 40 that are disposed within its communication zone and provides channel assignments and operating instructions to it. The connected vehicles 40 receive, contend for time to transmit, or are assigned a time to transmit on one or more radio frequency channels.

A systematic solution is provided for vehicle perception-sharing through V2X, based on which a wide range of applications can be supported, thereby facilitating the implementation of related products with the use of common (standardized) APIs. As appreciated, an API is a set of routines, protocols, and tools for building software applications, including core algorithms as described herein. Basically, an API specifies how software components should interact. Additionally, APIs are used when programming graphical user interface (GUI) components.

A software architecture is developed for mitigating the processing latency, together with the algorithms making combined use of distance and visual descriptors for identifying the overlapping between the perception results from different ones of the connected vehicles 40. This includes features that are intended for forward-seeing objectives pertaining to vehicle perception-sharing over V2X, and include problem formulation together with the corresponding functionality module design for the objective of providing common APIs that can be shared by a wide range of V2X-based applications and software architecture with the design of conflict-aware task parallelization. This results in awareness that is conveyed from an event-triggered conflict look-up mechanism to achieve latency mitigation, efficient computing resource utilization, and scalability. The concepts described herein facilitate connected intelligent driving (CID), in the framework of V2X perception-sharing, together with payload functionality modules, benefitting from common APIs, and V2X perception-sharing algorithms driven by the principle of efficient utilization of computing resources, and also the consideration for the need of scalability with real-time traffic flow as well as future wireless bandwidth expansion. The software architecture is tailored with a feature of parallelizing multiple tasks which potentially have conflicts, while the conflicts can be effectively avoided by making use of an event-triggered conflict look-up mechanism.

The term "controller" and related terms such as microcontroller, control module, module, control, control unit, processor and similar terms refer to one or various combinations of Application Specific Integrated Circuit(s) (ASIC), Field-Programmable Gate Array (FPGA), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and look-up tables. Each controller executes control routine(s) to provide desired functions. Routines may be executed at regular intervals, for example each 100 microseconds during ongoing operation. Alternatively, routines may be executed in response to occurrence of a triggering event. Communication between controllers, and communication between controllers, actuators and/or sensors may be accomplished using a direct wired point-to-point link, a networked communication bus link, a wireless link or another suitable communication link. Communication includes exchanging data signals in suitable form, including, for example, electrical signals via a conductive medium, electromagnetic signals via air, optical signals via optical waveguides, and the like. The data signals may include discrete, analog or digitized analog signals representing inputs from sensors, actuator commands, and communication between controllers.

The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, that is capable of traveling through a medium.

A parameter is defined as a measurable quantity that represents a physical property of a device or other element that is discernible using one or more sensors and/or a physical model. A parameter can have a discrete value, e.g., either "1" or "0", or can be infinitely variable in value.

Figure 2:
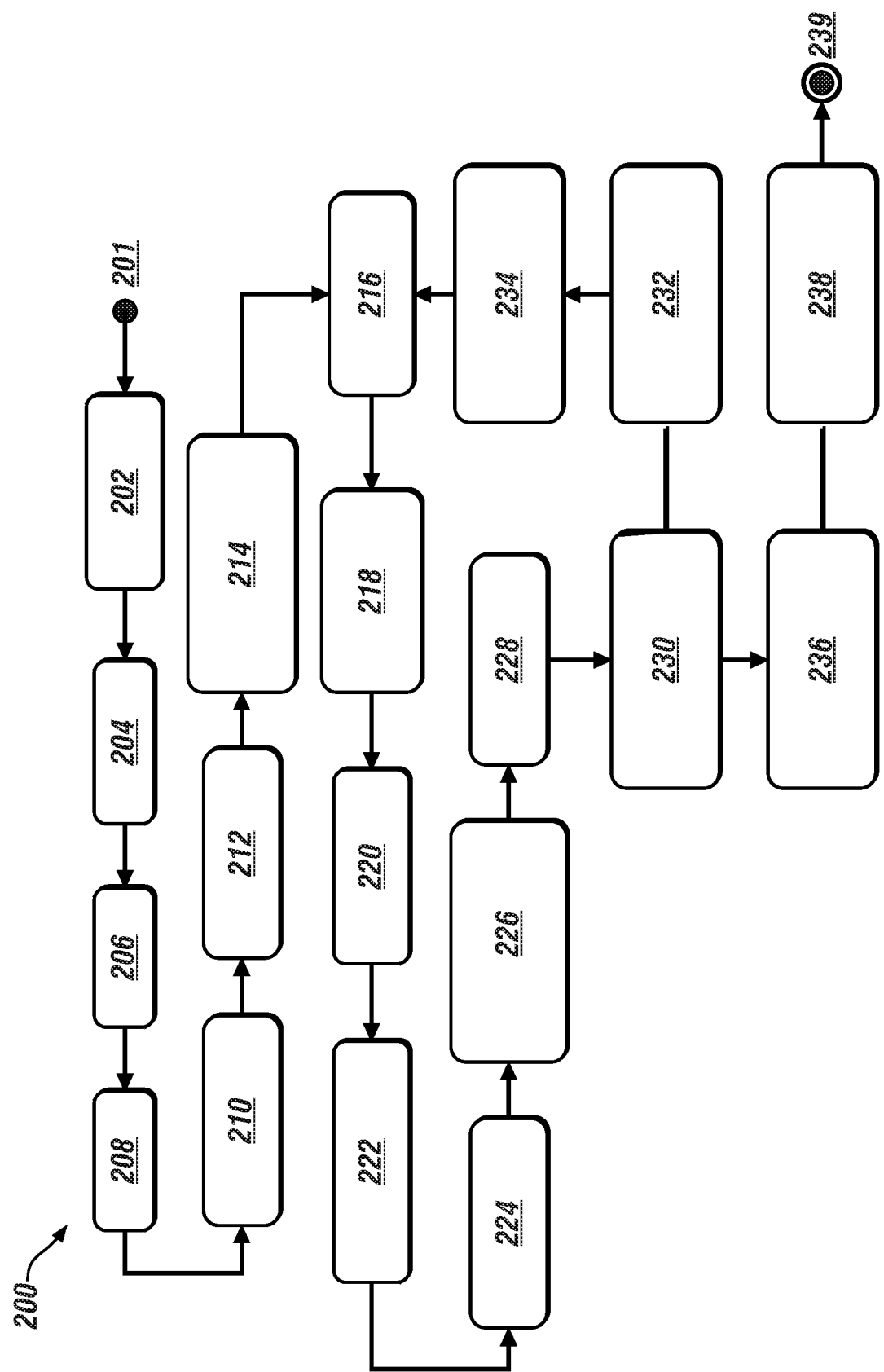
FIG. 2 schematically illustrates, in flowchart form, a Multi-Access Edge Computing (MEC)-based perception-sharing routine for cooperative perception of a driving environment, in accordance with the disclosure.

FIG. 2 schematically shows an embodiment of the MEC routine 200 that includes showing a main thread of the application-layer software for MEC-based cooperative perception of a driving environment, wherein an example of the driving environment is analogous to the portion of the multi-lane highway 50 and IVHS 100 that are described with reference to FIG. 1. The MEC routine 200 is primarily executed in the MEC cluster 10 that is described with reference to FIG. 1. The teachings may be described herein in terms of functional and/or logical block components and/or various processing steps. The MEC routine 200 is illustrated as a collection of blocks in a logical flow graph, which represents a sequence of operations that can be implemented in hardware, software, and/or firmware components that have been configured to perform the specified functions. In the context of software, the blocks represent computer instructions that, when executed by one or more processors, perform the recited operations. The steps of the MEC routine 200 may be executed in a suitable order, and are not limited to the order described with reference to FIG. 2.

The MEC routine 200 includes capturing a plurality of vehicle perception packets (VPP) (201), which are provided by one or more proximal connected vehicles that are operating in the driving environment and sent through an interface. Each of the VPPs encapsulates the data as needed by the core algorithms. Each VPP encapsulates the following information, by way of non-limiting examples: depth (distance); visual descriptors e.g., an RGB or HSV color histogram, SURF, or another image feature vector; lane-level lateral position; speed estimation of each detected object; and geo-spatial positioning information of the observing vehicle together with a corresponding time stamp. The geo-spatial positioning may be provided by a satellite navigation system that provides autonomous geo-spatial positioning with global coverage, including GNSS (Global Navigation Satellite System), Global Positioning System (GPS), and other regional systems.

The VPPs, which have been parsed, are pushed into a first buffer, referred to as a RecepBuffer (202), which is a temporary storage for the VPPs waiting to be processed. The VPPs are parsed by lower layers based on the signal received through the air interface of DSRC or C-V2X or some other wireless protocol for device-to-device communication. The RecepBuffer is used without being tied to a scheduled FPP transmission, and thus does not need to be periodically allocated and released. The RecepBuffer is monitored (204), which includes periodically querying the first buffer to find presence of a VPP, which is then taken out and conveyed it to a VPP pre-processing module (208) together with the current system time (206). The VPP pre-processing module (208) includes assigning a sub-thread of motion prediction for each of the VPPs that is conveyed by the previous module, with a target FPP transmission cycle (either current or next) being a sub-thread attribute.

The FPP ("Fused Perception Packet") is a data packet that is a fusion of the VPPs from the plurality of similarly-situated vehicles that are in communication with the RSU 20. The FPP encapsulates positioning data of each of the plurality of similarly-situated vehicles in communication with the RSU 20 based on the fusion of the received VPPs corresponding to a specific temporal and spatial range, supplemented by the ID and positioning information of the particular RSU 20. The FPP may include appropriate information for facilitating each of the connected vehicles 40 to identify which object described in the FPP refers to itself, i.e., to perform self-identification. The self-identification is based on an element of a Basic Safety Message (BSM) from each vehicle received by the RSU, namely the "DE_TemporaryID" field included in the BSM; alternatively some hash value of the time-frequency resources used by each vehicle for the last BSM or VPP transmission can be utilized to serve this purpose. The BSM is a message entity standardized by SAE (Society of Automotive Engineers) Standard J2735, which is intended to be broadcasted by individual vehicles through an air interface. A timing advance is determined as a target FPP transmission time plus t3 minus the VPP time stamp for motion prediction based on the system time obtained (210).

A motion prediction step (212) includes motion prediction followed by writing into a second buffer, referred to as a WaitBuffer. A motion-predicted VPP (MpVPP) is produced through the motion prediction algorithm by linearly extrapolating the positioning data of each object in the received VPP to a future time instant, as determined by one of the RSUs 20 based on the reception time of the corresponding VPP. A position interval is determined, and is represented by the front-most and rear-most object positions. The MpVPP is transferred to the second buffer, i.e., WaitBuffer, which is associated with the sub-thread attribute. Furthermore, an event flag indicating that a new MpVPP is being transferred to the WaitBuffer is conveyed. The motion prediction step includes linearly extrapolating the positioning data of each object in the received VPP to a future time instant, as determined by one of the RSUs 20 based on the reception time of VPP, which yields the corresponding motion-predicted VPP (MpVPP).

The MpVPP, along with the position interval, the sub-thread attribute, and the event flag are conveyed to the WaitBuffer (214) and used to update a MpVPP conflict look-up table (MpVPPConfLUT) as it pertains to the specific sub-thread attribute (current or next) given the inputs from step 212 and/or step 234 (216). The MpVPP conflict look-up table indicates whether there is potential overlap of objects or not between 2 MpVPPs, for the exhaustive pairs across the in-buffer MpVPPs and the in-matching-processing MpVPPs.

The updated MpVPP conflict look-up table (MpVPPConfLUT) is captured (218) and subjected to conflict-free MpVPP subset extraction (220).

The conflict-free MpVPP subset extraction (220) includes determining a conflict-free subset of in-buffer MpVPPs that is also in conflict-free status with the current in-matching-processing MpVPPs based on the MpVPPConfLUT, and removing the conflict-free subset of in-buffer MpVPPs from the WaitBuffer if it is non-empty. The conflict-free subset may be optimal or sub-optimal depending on the method used.

For each MpVPP conveyed by the previous module, a sub-thread of object matching is assigned (222).

A subset of the corresponding TransBuffer to which MpVPP is possible to be matched (TbMatchSet) is assigned according to MpVPP's position interval as a part of MpVPP pre-processing (224). The TbMatchSet and the sub-thread attribute are captured (226) and provided to an object matching routine (228), which is subject to a timing constraint.

The object matching routine (228) identifies objects referring to the same vehicle across the MpVPPs from different ones of the connected vehicles 40. The object matching routine (228) includes performing the object matching on multiple MpVPPs and TbMatchSet until the sub-thread serving the FPP transmission time instant T, i.e., with the attribute of "current" being terminated at time instant T−t2. When TbMatchSet is empty, MpVPP is used as the fusion result directly. Based on practical considerations, the object matching routine (228) adapts a maximal bipartite matching in the aspect that the edges produced by maximal matching are further pruned according to some upper threshold on the total matching score. The total matching score is calculated as the weighted harmonic mean of the matching scores pertaining to distance and visual descriptors, respectively.

For the object matching routine (228), the sub-task of edge score calculation together with pruning can be parallelized with a sub-thread assigned for each vertex (object) on the side with less vertices, i.e. for the N-th vertex on the side with less vertices. With such vertices processed in parallel, N edges with the lowest matching scores are retained upon the completion of the calculations of its associated edge scores, and the vertices are traversed in serial for the optimal match to be determined. In addition, to reduce the cost of frequent allocation and release, the sub-threads for edge score calculation together with pruning can be populated in the form of thread pools, which are managed by the timer thread in the same way as other sub-threads, and have the number of pools and pool sizes selected empirically. The timer thread is responsible for the allocation and release of buffers, change of sub-thread attributes, and also the termination of the sub-threads serving the current FPP transmission cycle according to the pre-defined timeline, as reflected by the time instants T−t1−t2, T−t2 and T shown with reference to FIG. 3.

Figure 3:
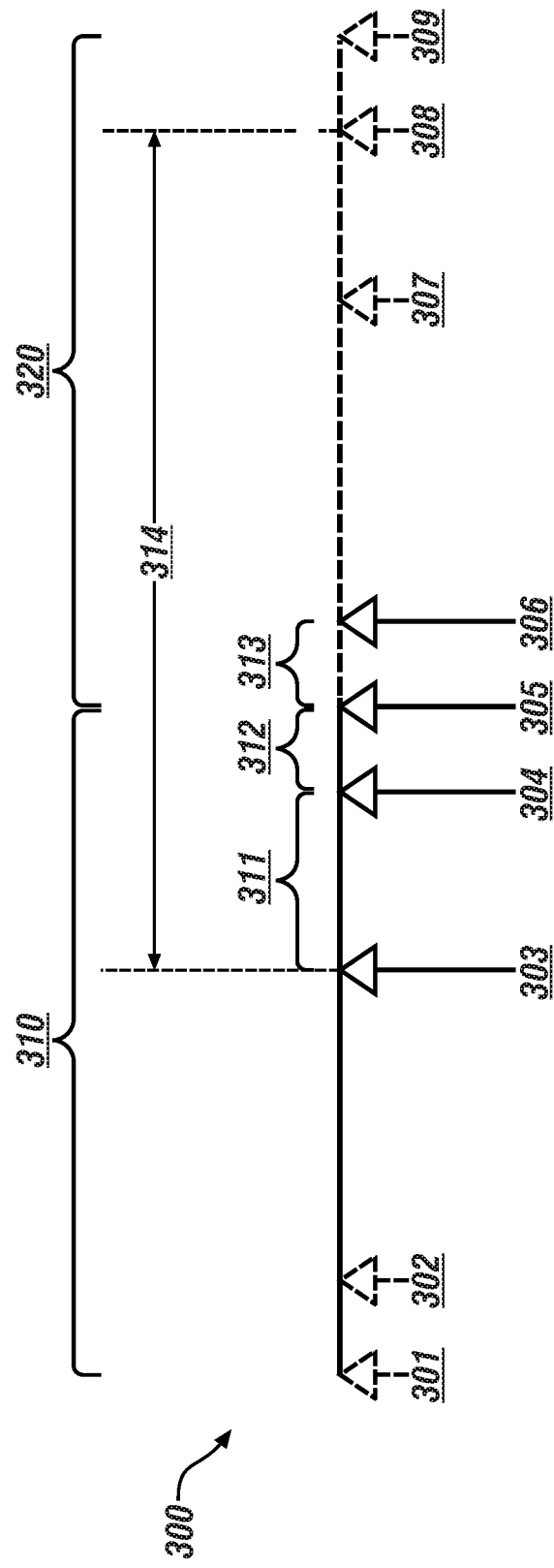
FIG. 3 schematically illustrates a timeline that indicates time-dependent tasks that are performed as part of an object matching routine, in accordance with the disclosure.

Referring again to FIG. 2, with continued reference to FIG. 3, the object matching routine (228) performs timing-dependent tasks. If the sub-thread serving the FPP transmission time instant T has not reached T−t2, then the corresponding TransBuffer is updated based on the fusion result, and more fusion is performed, with the event flag employed to indicate that some MpVPP has just been fused into the corresponding TransBuffer (230)(232). Otherwise the sub-thread is terminated and the corresponding TransBuffer will remain unchanged (230)(236) and be immediately wrapped into FPP by lower layers (238), and the resultant FPP is output to the lower layers at the time instant T−t2 (239). The resultant FPP is in the form of a GPS location, speed and trajectory of each of the plurality of similarly-situated vehicles that are in communication with the RSU 20.

FIG. 3 schematically shows a timeline 300 that indicates time-dependent tasks that need to be performed, with details being related to software architecture design in timing, thread and buffer management. A current FPP transmission cycle 310 and a next FPP transmission cycle 320 are indicated. An FPP transmission period is defined as ΔT. Other time periods include: t1 311, which is a time duration from a VPP being parsed by lower layers to this VPP being done for object matching; t2 312, which is a time duration for lower layers to wrap FPP and transmit it through PC5 interface; and t3 313, which is a time duration from a FPP being transmitted by RSU 20 to this FPP being applied on terminal applications run on vehicles. Time durations t1, t2 and t3 indicate latencies in the system.

Timepoint 305 indicates T, which is the FPP transmission time instant, i.e., the end of the current transmission cycle 310, and also a point at which the sub-thread attributes are changed from "next" to "current". Timepoint 301 indicates T−ΔT, which is an FPP transmission time instant of the previous transmission cycle, and timepoint 302 indicates T−ΔT+t3. Timepoint 303 indicates T−t1−t2: time instant for the allocation of MpVPPConfLUT(T+ΔT), WaitBuffer(T+ΔT) and TransBuffer(T+ΔT), and the beginning of assignment of sub-threads serving the FPP transmission time instant T+ΔT (i.e. having the sub-thread attribute of "next") if incurred by the VPPs obtained afterwards. Timepoint 304 indicates T−t2: time instant for the finalization of TransBuffer(T) and its being wrapped into FPP(T), termination of the sub-threads serving the FPP transmission time instant T, and the release of MpVPPConfLUT(T), WaitBuffer(T) and TransBuffer(T). Timepoint 306 indicates T+t3 (not paid attention to by the timer thread): the target time instant for motion prediction sub-threads serving the FPP transmission time instant T, timepoint 307 represents T+ΔT−t1−t2, timepoint 308 represents T+ΔT−t2, and timepoint 309 represents T+ΔT, which indicates the FPP transmission time instant of the next transmission cycle. The timeline 300 includes assumptions on transmission periodicity and processing latency, in which the time duration from (T−ΔT) to T is referred to as the "current" FPP transmission cycle. Transmission periodicity refer to the time instants T−ΔT, T and T+ΔT, which indicates the FPP transmission period of ΔT. Note that the time duration of t1 is not confined to its position shown in FIG. 3. This position actually indicates the deadline (T−t1−t2) for the newly obtained VPPs to incur the sub-threads serving the FPP transmission time instant T, which is also the beginning for the newly obtained VPPs to incur the sub-threads serving the FPP transmission time instant T+ΔT.

The WaitBuffer, TransBuffer, and MpVPPConfLUT, with one complete life span of them indicated by period 314, are used and associated with a specific current FPP transmission cycle or a next FPP transmission cycle, as reflected by the time instants T−t1−t2 and T−t2 in FIG. 3 pertaining to their allocation (for the T+ΔT cycle) and release (for the T cycle). The conflict look-up tables MpVPPConfLUT may be evaluated in complete or non-complete form depending on the method used for evaluation. Parallelization of the object matching tasks, i.e., sub-threads, is enabled by a conflict look-up and avoidance mechanism.

The concepts described herein provide a methodology that facilitates cooperative perception of a driving environment among similarly-situated connected vehicles 40 and RSUs 20, intended for supporting a wide range of applications, e.g., enablement of blind area monitoring, detection, and mitigation for individual vehicles and other applications based on sensory information that is obtained over V2X. Mitigation for individual vehicles and other applications based on sensory information that is obtained over V2X may include controlling, via the ADAS 46, controlling one or more of the propulsion system, the wheel braking system, and the steering system with little or no direct interaction of the vehicle operator in response to the cooperative perception of the driving environment. It incorporates design of perception data packet formats intended for MEC-based perception-sharing, core algorithms employing the packet formats that are tailored for use under the framework of V2x perception-sharing, and a software architecture design in timing, thread and buffer managements. In addition to the conflict-aware task parallelization, there are also other features to serve multiple objectives such as latency mitigation.

Core algorithms making use of the packet formats and adapted for robustness related to sensing include direct sensing of vehicles and pedestrians via spatial monitoring system devices such as cameras, LIDAR and RADAR, direct sensing of vehicles from their V2X position reports, and indirect sensing via cloud-provided information. Core algorithms making use of the packet formats and adapted for robustness related to analysis include sensor fusion, traffic flow optimization, and vulnerable road user warnings. Core algorithms making use of the packet formats and adapted for robustness related to acting and other terminal applications include traffic light control, communicate, direct communication of signal phase and timing to approaching vehicles, broadband wireless hotspot connectivity (cellular and Wi-Fi), and ADAS operation.

Embodiments in accordance with the present disclosure may be embodied as an apparatus, method, or computer program product. Accordingly, the present disclosure may take the form of an entirely hardware embodiment, an entirely software embodiment (including firmware, resident software, micro-code, etc.), or an embodiment combining software and hardware aspects that may generally be referred to herein as a "module" or "system." Furthermore, the present disclosure may take the form of a computer program product embodied in a tangible medium of expression having computer-usable program code embodied in the medium.

Various combinations of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in a combination of one or more programming languages.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by dedicated-function hardware-based systems that perform the specified functions or acts, or combinations of dedicated-function hardware and computer instructions. These computer program instructions may also be stored in a computer-readable medium that can direct a computer or other programmable data processing apparatus to function in a particular manner, such that the instructions stored in the computer-readable medium produce an article of manufacture including instruction set that implements the function/act specified in the flowchart and/or block diagram block or blocks.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A method for perception-sharing between a plurality of similarly-situated vehicles, the method comprising:
    executing, in a multi-access edge computing cluster in communication with a roadside unit disposed to monitor a portion of a roadway, an application-layer routine, wherein the application-layer routine includes:
        collecting real-time data associated with a plurality of objects from each of the plurality of similarly-situated vehicles traveling on the portion of the roadway,
        predicting motion of each of the plurality of objects based upon the real-time data from the plurality of similarly-situated vehicles,
        object-matching the motion of each of the plurality of objects, wherein the object-matching is determined as a weighted harmonic mean of matching scores for a distance descriptor and a visual descriptor of each of the plurality of objects, and
        executing, via the multi-access edge computing cluster, fusion of the plurality of objects based upon the object-matching of the motion of each of the plurality of objects, wherein the fusion of the plurality of objects is time-constrained based upon a data transmission cycle for the multi-access edge computing cluster;
    identifying, via the multi-access edge computing cluster, locations of the similarly-situated vehicles traveling on the portion of the roadway based upon the fusion of the plurality of objects;
    communicating, via the roadside unit, the locations of the similarly-situated vehicles traveling on the portion of the roadway to one of the similarly-situated vehicles; and
    controlling an advanced driver assistance system of the one of the similarly-situated vehicles in response to the locations of the similarly-situated vehicles traveling on the portion of the roadway.

2. The method of claim 1, wherein collecting real-time data associated with the plurality of objects from each of the plurality of similarly-situated vehicles comprises collecting data related to distance, a visual descriptor, a lane-level lateral position, and a speed estimation of each of the plurality of objects, a corresponding time stamp, and a geo-spatial positioning of a respective one of the plurality of similarly-situated vehicles.

3. The method of claim 2, wherein predicting motion of each of the plurality of objects based upon the real-time data from the plurality of similarly-situated vehicles comprises linearly extrapolating the geo-spatial positioning data of each of the plurality of objects.

4. The method of claim 1, further comprising executing blind area monitoring by at least one of the plurality of similarly-situated vehicles to overcome masking by an intervening vehicle based upon the fusion of the plurality of objects.

5. The method of claim 1, wherein the similarly-situated vehicles comprise a plurality of vehicles that are travelling in the same direction on the portion of the roadway.

6. The method of claim 1, wherein identifying locations of the similarly-situated vehicles traveling on the portion of the roadway based upon the object-matching of the motion of each of the plurality of objects comprises determining a location, speed and trajectory of each of the plurality of similarly-situated vehicles.

7. An application-layer software routine in communication with a roadside unit that is arranged to monitor a portion of a roadway, wherein the software routine includes an instruction set that is executable to:
    collect real-time data associated with a plurality of objects from each of a plurality of similarly-situated vehicles traveling on the portion of the roadway,
    predict motion of each of the plurality of objects based upon the real-time data from the plurality of similarly-situated vehicles,
    object-match the motion of each of the plurality of objects, wherein the object-matching is subjected to a time constraint, wherein the object-matching is determined as a weighted harmonic mean of matching scores for a distance descriptor and a visual descriptor of each of the plurality of objects, and
    fuse, via a multi-access edge computing cluster, the plurality of objects based upon the object-match of the motion of each of the plurality of objects, wherein the fusion of the plurality of objects is time-constrained based upon a data transmission cycle for the multi-access edge computing cluster;
    identify locations of the similarly-situated vehicles traveling on the portion of the roadway based upon the fused plurality of objects; and
    communicate, via the roadside unit, the locations of the similarly-situated vehicles traveling on the portion of the roadway to one of the similarly-situated vehicles;
    wherein the application-layer software routine is executed by the multi-edge computing cluster including a cloud-based information technology service environment that is located at an edge of a network; and
    wherein an advanced driver assistance system of the one of the similarly-situated vehicles is controlled in response to the locations of the similarly-situated vehicles traveling on the portion of the roadway.

8. The application-layer software routine of claim 7, wherein the multi-edge computing cluster is cloud-based.

9. The application-layer software routine of claim 7, wherein the instruction set executable to collect real-time data associated with the plurality of objects from each of the plurality of similarly-situated vehicles comprises the instruction set executable to collect data related to distance, a visual descriptor, a lane-level lateral position, and a speed estimation of each of the plurality of objects, a corresponding time stamp, and a geo-spatial positioning of a respective one of the plurality of similarly-situated vehicles.

10. The application-layer software routine of claim 9, wherein the instruction set executable to predict motion of each of the plurality of objects based upon the real-time data from the plurality of similarly-situated vehicles; and the instruction set executable to linearly extrapolate the geo-spatial positioning data of each of the plurality of objects.

11. The application-layer software routine of claim 7, wherein the instruction set executable to monitor a blind area by monitoring by at least one of the plurality of similarly-situated vehicles based upon the fusion of the plurality of objects.

12. The application-layer software routine of claim 7, wherein the similarly-situated vehicles comprise a plurality of vehicles that are travelling in the same direction on a same portion of the roadway.

13. The application-layer software routine of claim 7, wherein the instruction set executable to identify locations of the similarly-situated vehicles traveling on the same portion of the roadway based upon the fused plurality of objects comprises the instruction set executable to determine location, speed and trajectory of each of the plurality of similarly-situated vehicles.

14. A method for perception-sharing between a plurality of similarly-situated vehicles, the method comprising:
executing, in a multi-access edge computing cluster in communication with a roadside unit disposed to monitor a portion of a roadway, an application-layer routine, including:
collecting, from each of the plurality of similarly-situated vehicles traveling on the portion of the roadway, real-time data associated with a plurality of objects that are disposed on the portion of the roadway,
predicting motion of each of the plurality of objects based upon the real-time data from the plurality of similarly-situated vehicles,
object-matching the motion of each of the plurality of objects, wherein the object-matching is determined as a weighted harmonic mean of matching scores for a distance descriptor and a visual descriptor of each of the plurality of objects, and
executing fusion of the plurality of objects based upon the object-matching of the motion of each of the plurality of objects, wherein the fusion of the plurality of objects is time-constrained based upon a data transmission cycle for the multi-access edge computing cluster;
identifying locations of the similarly-situated vehicles traveling on the portion of the roadway based upon the fusion of the plurality of objects;
communicating, via the roadside unit, the locations of the similarly-situated vehicles traveling on the portion of the roadway to one of the similarly-situated vehicles, wherein the one of the similarly-situated vehicles includes an advanced driver-assistance system (ADAS); and
controlling an advanced driver assistance system of the one of the similarly-situated vehicles in response to the locations of the similarly-situated vehicles traveling on the portion of the roadway.

15. The method of claim 14, wherein collecting the real-time data comprises collecting data related to distance, a visual descriptor, a lane-level lateral position, and a speed estimation of each of the plurality of objects, a corresponding time stamp, and a geo-spatial positioning of a respective one of the plurality of similarly-situated vehicles.

16. The method of claim 15, wherein predicting the motion of each of the plurality of objects based upon the real-time data from the plurality of similarly-situated vehicles comprises linearly extrapolating the geo-spatial positioning data.

17. The method of claim 14, further comprising executing blind area monitoring by at least one of the plurality of similarly-situated vehicles based upon the fusion of the plurality of objects.

18. The method of claim 14, wherein the similarly-situated vehicles comprise a plurality of vehicles that are travelling in the same direction on the portion of the roadway.

19. The method of claim 14, wherein identifying locations of the similarly-situated vehicles traveling on the portion of the roadway based upon the object matching from the motion of each of the plurality of objects comprises determining a location, speed and trajectory of each of the plurality of similarly-situated vehicles.

20. The method of claim 14, further comprising controlling the one of the similarly-situated vehicles that includes an advanced driver-assistance system based upon the locations of the similarly-situated vehicles traveling on the portion of the roadway.

* * * * *